(12) United States Patent
Young

(10) Patent No.: US 7,750,846 B2
(45) Date of Patent: Jul. 6, 2010

(54) RECEIVER FOR RADIO POSITIONING SIGNALS

(75) Inventor: Phil Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/331,855

(22) Filed: Dec. 10, 2008

(65) Prior Publication Data

US 2009/0201202 A1  Aug. 13, 2009

Related U.S. Application Data

(63) Continuation of application No. PCT/EP2006/063346, filed on Jun. 20, 2006.

(51) Int. Cl.
*G01S 19/09* (2010.01)
*G01S 19/24* (2010.01)

(52) U.S. Cl. .................................... 342/357.12

(58) Field of Classification Search ............. 342/357.12
See application file for complete search history.

(56) References Cited

U.S. PATENT DOCUMENTS 6,018,784 A  1/2000  Gildea et al.

OTHER PUBLICATIONS

Akos, et al., "Real-Time GPS Software Radio Receiver", ION NTM 2001, Long Beach, CA, Jan. 22, 2001, pp. 809-816.
Damazio, Denis O. and Takai, Helio, The Cosmic Ray Radio Detector Data Acquisition System, Nuclear Science Symposium Conference Record, 2004 IEEE Rome, Italy, Oct 16-22, 2004, Piscataway, NJ, USA, IEEE, Oct. 16, 2004, pp. 1205-1211.
International Search Report dated March 23, 2007.

*Primary Examiner*—Thomas H Tarcza
*Assistant Examiner*—Fred H Mull
(74) *Attorney, Agent, or Firm*—Shyam K. Parekh

(57) ABSTRACT

A GPS or Galileo receiver for radio positioning signals wherein at least a part of the computing of position related data based on radio signals received from a plurality of space vehicles is carried out by a processor (21) mounted on a graphic or sound card (20). The receiver thus makes use of available computing resources, thus achieving a lower Bill of Material.

21 Claims, 3 Drawing Sheets

RECEIVER FOR RADIO POSITIONING SIGNALS

This utility patent application is a continuation of international patent application PCT/EP2006/063346, filed Jun. 20, 2006, the content of which is incorporated by reference.

TECHNICAL DOMAIN

The present invention relates to a receiver for radio positioning signals, in particular to a receiver for the acquisition and tracking of satellite localization signals such as GNSS (Global Navigation Satellite System), GPS, GLONASS or Galileo signals. The present invention also relates to software used in such a receiver.

DESCRIPTION OF RELATED ART

FIG. 1 illustrates an example of a known software GPS receiver. The illustrated receiver comprises a first chip 1 to do the RF-down conversion and digitization, and a second module 2, usually built around a general purpose processor or a digital signal processor 9, that runs a program for performing the correlation and tracking procedure as well as the navigation. Both chips are mutually connected over a proprietary data bus 3. Solutions including both modules in a single chip have also been suggested.

In a GNSS system the sources are orbiting GNSS Space Vehicles (SV). In the case of the GPS, which is readily extendable to other radiolocalization systems, each space vehicle transmits two microwave carrier signals. The signal L1 at 1575.42 MHz carries the navigation message. The signal L2 at 1227.60 MHz is used among others to measure the ionospheric delay. The L1 and/or L2 signals are modulated with three binary codes:

- The C/A Code (Coarse Acquisition) modulates the phase of the L1 carrier signal. The C/A code is a Pseudo Random Noise (PNR) at 1 MHz that repeats every 1023 bits (1 millisecond). Each SV uses a different C/A code. This noise-like code spreads the spectrum of the modulated signal over a 1 MHz bandwidth to improve immunity against noise.
- The navigation message also modulates the L1-C/A code signal. It is a 50 Hz signal consisting of data bits that describe the GPS satellite orbits, clock corrections and other system parameters.
- The P-Code (precise) modulates both the L1 and the L2 signals, and is for use only by authorized users with cryptographic keys.

The task of a GPS receiver is to retrieve the signals received from the various space vehicles that can be seen at a given instant. For that, the circuit of FIG. 1 comprises an antenna 4 whose output signal is amplified in the first chip 1 by a low-noise amplifier 5 and down-converted to an intermediate frequency signal (IF signal) in the conversion unit 6, before being fed to the carrier removal stage 7. The IF signal often comprises one in-phase (i) and one quadrature (q) component, which are converted by analog to digital converter 8 into digital signals (I, Q) delivered over a data bus 3 to the second module ("correlator") for further processing.

The function of the correlator 2 is mainly to de-spread the signals I, Q delivered by the RF chip and originating from the various SVs. For that, the correlator aligns temporally the incoming signals with locally generated copies of the PNR signals of each existing or likely SV. In order to reduce the computation overhead and the acquisition time, alignment is often performed in the frequency domain, by correlating a FFT transform of the incoming signals I, Q with FFT transforms of the PNR signals characterizing each SV. There are various algorithms used by different manufacturers for carrying out this correlation in the time or frequency domain. It is however due to the fact that the correlation and de-spreading processes tend to require a lot of processing power. For example, a correlation in the frequency domain requires a lot of processing power for the computation of FFTs, multiplication by the complex conjugates of the CA Codes, and Inverse FFT on the results that are needed for a fast time-to-frequency conversion.

In addition to the processing requirements this process also requires a large amount of storage for data and results.

The correlator 2 outputs digital processed data that are fed over the data bus 3 to an acquisition and navigation processor 11 for computing and for displaying position related data, including for example the position of the receiver. The nature of the data output by the correlator depends on the receiver; some modules already deliver the location coordinates while others only deliver intermediary values such as Pseudo Ranges of the orbiting SV's.

In the prior art, the correlator 2 is often built around a general purpose or digital signal purpose processor 9 accessing its own data and instruction memory 10. Examples of known correlators include the NJ1030 and NJ2020 baseband processors produced by the applicant.

It is also known to use an FPGA or a dedicated ASIC as a correlator for computing the FFTs and for the various other computations performed by the module 2.

Processors, Asics and FPGA are however expensive, power and space consuming, therefore, the hardware resources 2 required for the correlation and tracking procedures have a significant impact on the price, volume and power-consumption of the overall receiver. Additionally these resources are often dedicated to the GPS algorithm and cannot be used for other purposes even when they are no longer required by the GPS function.

It has also been suggested to use a general purpose CPU 11 in the system for the computation of the FFT required for the correlation. Although general purpose CPUs are fast, the total system throughput is often not fast enough. Moreover, this solution makes an inefficient use of the available memory bandwidth and puts a high load on the CPU, thus, blocking it from other tasks.

It is therefore a goal of the present invention to provide the digital processing power required by a radio positioning signal receiver in a less expensive, less power-consuming and less space consuming way than in the prior art, and in a manner which shares the resources efficiently so that they can also be used for other system functions when not required by the navigation functions.

BRIEF SUMMARY OF THE INVENTION

According to the invention, these aims are achieved by means of the object of the independent claims. Further optional features are the object of the dependent claims.

In particular, these aims are achieved by means of a receiver for radio positioning signals comprising digital signal processing parts as part of a graphic or sound card for the computing of position related data based on radio signals received from a plurality of space vehicles.

In the context of this application, "position related data" is not limited to the position itself, but also encompass any data derived from the position, including the speed, acceleration, altitude, etc, as well as any intermediate data or values used for computation of the position from the radio positioning signals received by the receiver. The position related data includes for example the FFT transforms of signals derived from the received signals, or properties, for example code and Doppler shifts, of candidate correlation peaks, computed by the card, even if a single FFT value or a set of correlation peaks do not yet allow a full determination of the pseudo ranges or position.

These aims are also achieved by a receiver for radio positioning signals comprising:

a high frequency part for the acquisition and processing of analog radio signals from a plurality of satellites, said high frequency part delivering digital intermediary signals, digital signal processing parts for the de-spreading of said digital intermediary signals, wherein said digital processing parts comprises a processor as part of a graphic or sound card.

Graphic processing units are usually significantly faster than general purpose CPUs, but they are specialized for specific task, especially repetitive tasks requiring a large memory bandwidth. Much of the available processing power offered by graphic cards is used only by few applications, like games and graphic software, and remains unused during other applications, like office and geographic navigation programs. Therefore, according to the invention, the computing-requiring tasks of GPS computations are performed by the graphic or sound card that remains for the most part unused during many GPS-based applications.

Additionally, in 3D Graphics and Audio applications these processors are usually attached to large dedicated memories with high bandwidth capabilities used typically for storing and processing textures and audio images. In all but the most demanding games applications these are generally mostly unused and can be re-targeted for use in GPS functions.

In most 3D audio and Graphics applications the associated processors are optimized for performing repetitive mathematical tasks on blocks of data and are ideally suited for efficiently performing the functions required for the GPS signal processing.

The receiver thus takes advantage of the available resources in the system more efficiently than the traditional approach.

BRIEF DESCRIPTION OF THE DRAWINGS

The invention will be better understood with the aid of the description of an embodiment given by way of example and illustrated by the Figures wherein:

FIG. 2 illustrates an embodiment of a receiver for radio positioning signals according to the invention. This receiver may be used for receiving and processing signals from GPS, Galileo or Glonass satellites, or from terrestrial positioning systems. It is built around a general purpose computer, such as a personal computer, a laptop, a palmtop, a portable media player, an Origami computer, a smartphone, etc. The receiver therefore generally comprises one or more general purpose processors 11, for example a Pentium, ARM, or ARC processor, for running an operating system and software applications, including navigation software and other office utility, communication and game applications. Other components, including a general purpose RAM, input and output peripherals such as display, loudspeaker, keyboard, pointing device, drives, etc, are globally referred with reference number 12 and connected to the processor over a general-purpose bus, such as a PCI, AMBA, or preferably PCI-Express bus, or through other non illustrated components. The receiver also includes communication interfaces 13 (WLAN, Bluetooth, cellular, Ethernet, etc,) for communicating with external systems 14, possibly including positioning assistance servers.

Figure 1:
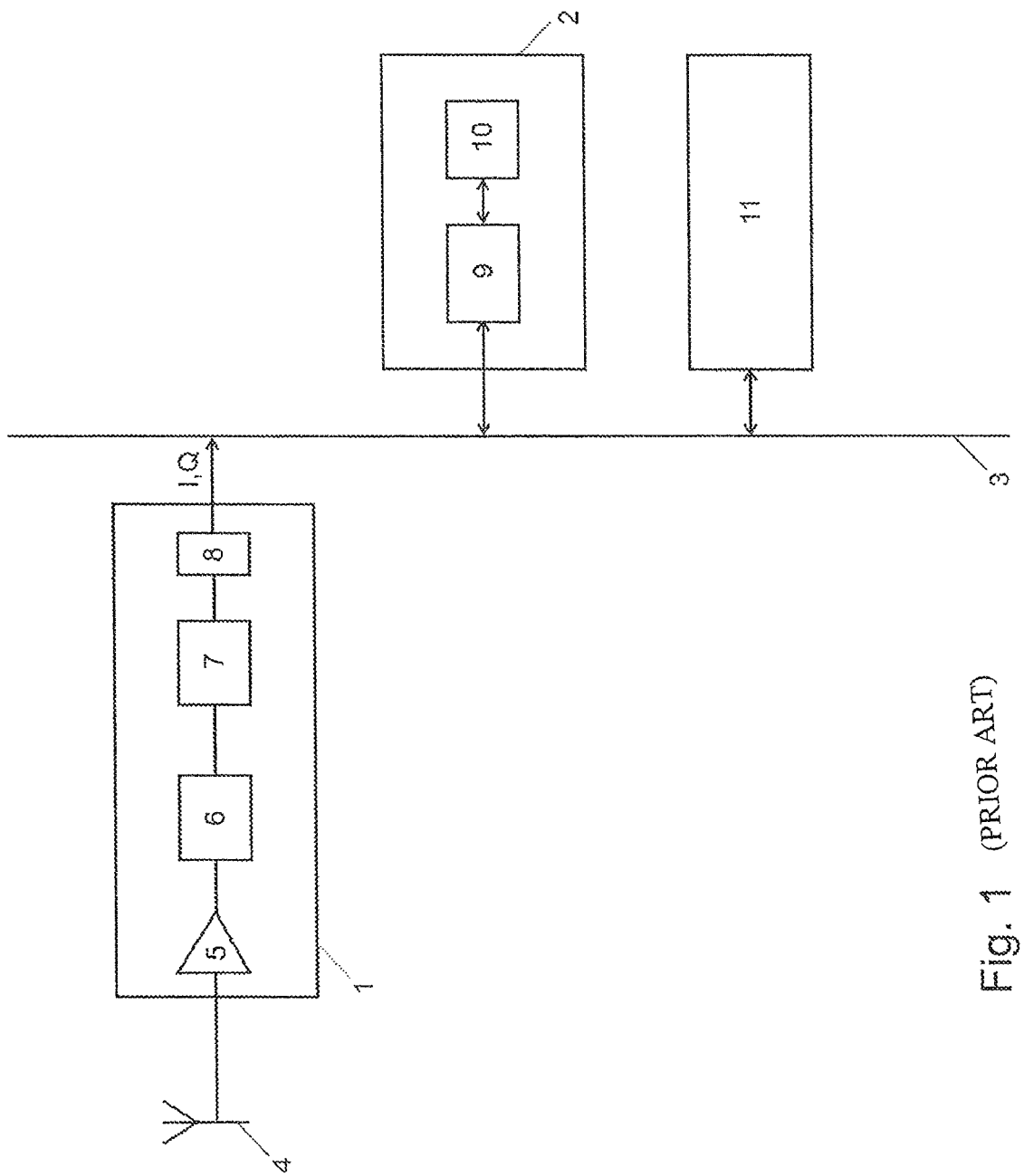
FIG. 1 is a block diagram illustrating a known software GPS receiver.

A graphic and/or sound card 20 provides computing functions required for visual and/or audio restitution of data. The graphic/sound card 20 is built around at least one processor 21, for example a digital signal processor or a dedicated graphic or sound processor, and accesses its own data memory 22 and instruction memory 23. Frequently the graphic/sound card includes one or several groups of parallel processors, designed to perform several tasks of similar nature at the same time. The general architecture of the receiver may be conventional and does not need to be described with more details.

The receiver of the invention also comprises a high frequency part 1, preferably mounted on a removable card inserted in a slot of the receiver, for example a PCI-Express card. The high frequency part may, for example, comprise analogue components and build a super-heterodyne receiver front-end for receiving signals in the GPS L1 band. It includes a connector for an external GPS antenna 4. Signal from the antenna is fed to a low noise amplifier 5, for example, a single stage cascade device. The signal is then fed to a conversion unit 6, for example, a single-balanced mixer that converts the radio-frequency signal to the baseband or preferably to an intermediate frequency. Filter means 7 are provided at the output of the conversion unit 6 to remove the carrier and to select the desired signal bandwidth. Analog-to-digital converters 8 converts the analog signals at the output of the stage 7 into two series of words, encoding into two orthogonal digital signals I and Q delivered over the data bus 3 to the second module ("correlator") for further processing.

In an embodiment, the RF module 1 may be built around a conventional NJ1006A or compatible chip.

According to a variant of the invention not represented in the pictures, the high frequency part 1 does not provide directly digital demodulated signal I and Q, but rather a signal in which the signals I and Q are modulated over a low frequency intermediate carrier (low IF). In the subsequent stages of the receiver, the low IF signal is converted into I and Q baseband signals by known means.

According to the invention, at least one part of the instruction memory 23 of the graphics or sound card 20 has been programmed so as to include functions for computing position related data, or intermediate values for the determination of the position, based on data delivered by the RF module 1. In an embodiment, the instruction memory 23 of the card 20 is a permanent or semi-permanent memory, such as an EEPROM for example, that has been programmed during manufacture or personalization to include software code for computation of the functions and methods requested by the location signals receiver. In another embodiment, the processor 21 of the card 20 is able to run software code stored in the instruction memory 23 or in the system 12 and that can be dynamically updated at any time. In both situations, the processor 21 of the card 20 responds to instructions 210 received over the bus 30 for deciding on the portion of software code to execute at each moment.

Computation of the position related data by the card 20 is preferably done in parallel to the execution of other functions of the card. In this case, display by the graphic card may be slowed down during computation of position related data, and/or the use of some extended graphic or sound functions may be momentarily prevented. In another embodiment, the card is entirely devoted to the computation of the positioning data during use, and the display, or at least one part of the display, is temporarily frozen during the acquisition and/or tracking process.

The functions performed by the processing means 21 on the card 20 may include some or all of the functions performed by the correlator 2 in the prior art embodiment of FIG. 1. More specifically, the processor 21 can run any function needed for the acquisition and/or tracking of signals from the various space vehicles, including correlation functions for temporal alignment, in the time or frequency domain, of the signals delivered by the RF part 1 with locally generated copies of the PRN signals of each existing or likely space vehicle. The graphic or sound card may thus include and execute routines for generating those copies of the PNRs signals, and/or routines for performing the correlation of signals.

According to a preferred embodiment of the invention, the correlation of the signals delivered by the RF part 1 is carried out by a correlation engine in the frequency domain, implemented by appropriate software elements executed by the processor 21 of the card 20 and, preferably, stored in a memory 23 of the card 20. In this case the processor 21 of the card 20 is programmed, for example, with routines for computing Fourier transforms, for example FFTs and inverse FFTs, etc.

The correlation operation being equivalent to a simple multiplication in the frequency domain, the processor 21 will be preferably programmed to compute, or retrieve from a pre-calculated table, the Fourier counterparts of the PRN signals of each existing or expected space vehicle, and evaluate the corresponding correlation function with the incoming RF signal from the RF front-end. The person skilled in the art will appreciate that this frequency domain approach is especially appropriate when the received signals are weak and, consequently, the search space is very large.

The large computational bandwidth of the processor 21 allows, in this case, to acquire and track weak GPS signals with high-sensitivity, without placing a large burden on the main processor 11.

Preferably the correlation data computed in the card 20 used to obtain the relative time shifts of pseudorandom noise codes comprised in the signals delivered by said high frequency part 1, and received from the different satellites in sight. Such relative time shifts are indicated, for example, by the position of the correlation peaks for the corresponding satellites in histograms accumulated in the card 20.

Preferably, the correlation data computed in the card 20 are transferred, by means of the bus 30, to a navigation module implemented by appropriate software modules, executed by the main processor 11. Once a sufficient number satellite signals are detected and tracked, the correlation module uses the determined relative shifts, indicated for example by the position of the corresponding correlation peaks, to determine the position of the receiver, as it is known in the art. The invention includes, however, also variants in which parts or all of the functions of the navigation module are delegated to the processor 21 of the card 20.

In the case of an assisted GPS system, the functions executed by the graphic card may also use assistance information retrieved from external assistance servers 14 by the main processor 11 and transmitted to the graphic card over the bus 30.

In a preferred embodiment, the functions of the graphic card 11 are piloted by a suitable program run by the general purpose processor 11 of the system. The processor 11 also runs the operating system and application software, including a navigation software for computing the position and other data based on digital data computed and output by the card 20. As already mentioned, the system may also comprise one or several communication interfaces 13, for example a cellular, WLAN, Bluetooth or Ethernet connection for accessing external devices 14 and retrieving assistance data to help the receiver for a fast acquisition of position, even in difficult condition such as indoors or in urban canyons, as well as maps or traffic information for example.

Figure 2:
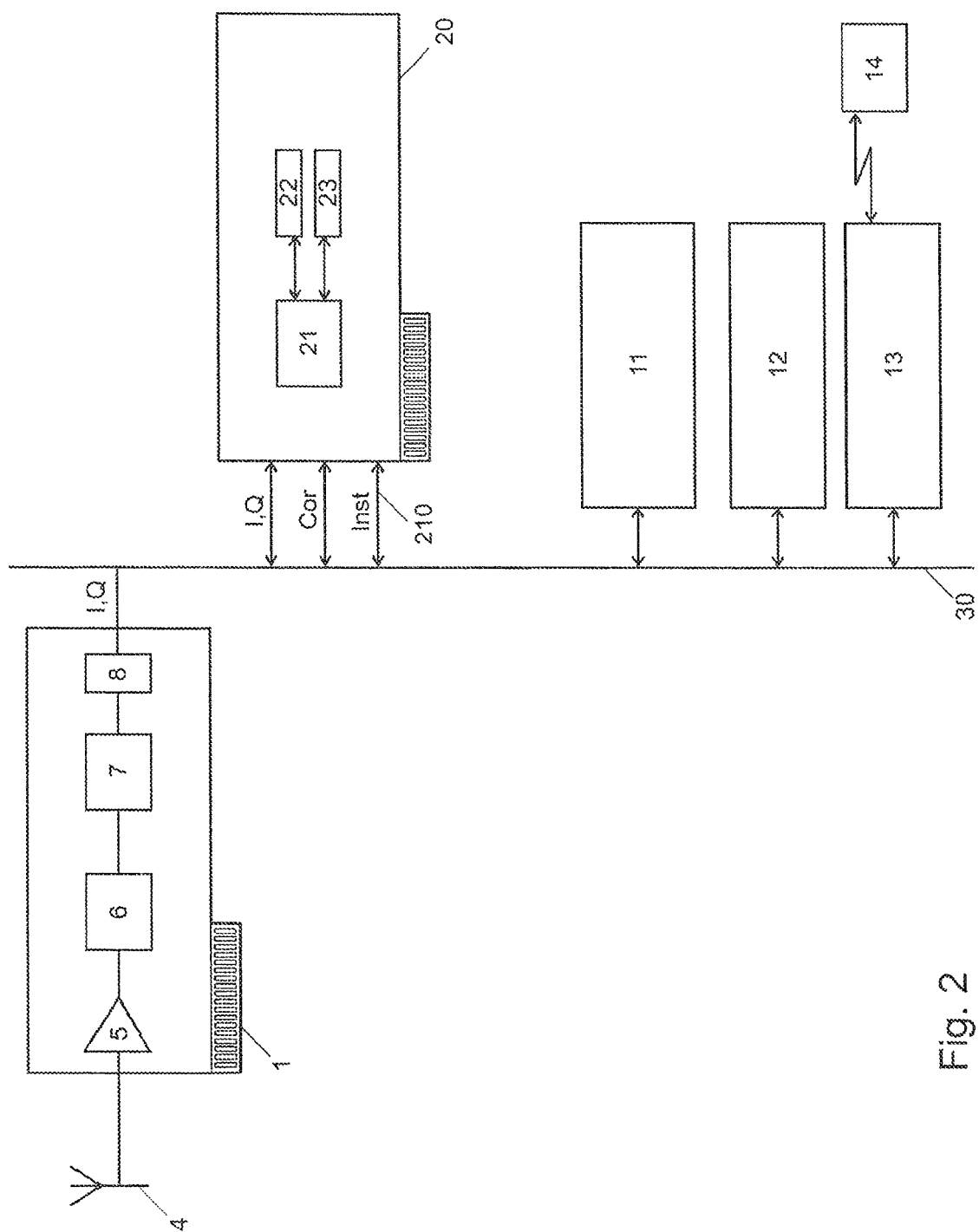
FIG. 2 is a block diagram illustrating a first embodiment of receiver according to the invention.

In the embodiment of FIG. 2, all computations in the baseband are performed by the sound or graphic card and by the general purpose computer 11. The only additional components that are added to a GPS-less system are the antenna 4, the RF-chip 1 and possibly a memory 23 on the graphic card 20 with an additional set of instructions. The cost and complexity of the system are thus very low, but the computing load on the graphic card and on the general purpose processor 11 is high.

Figure 3:
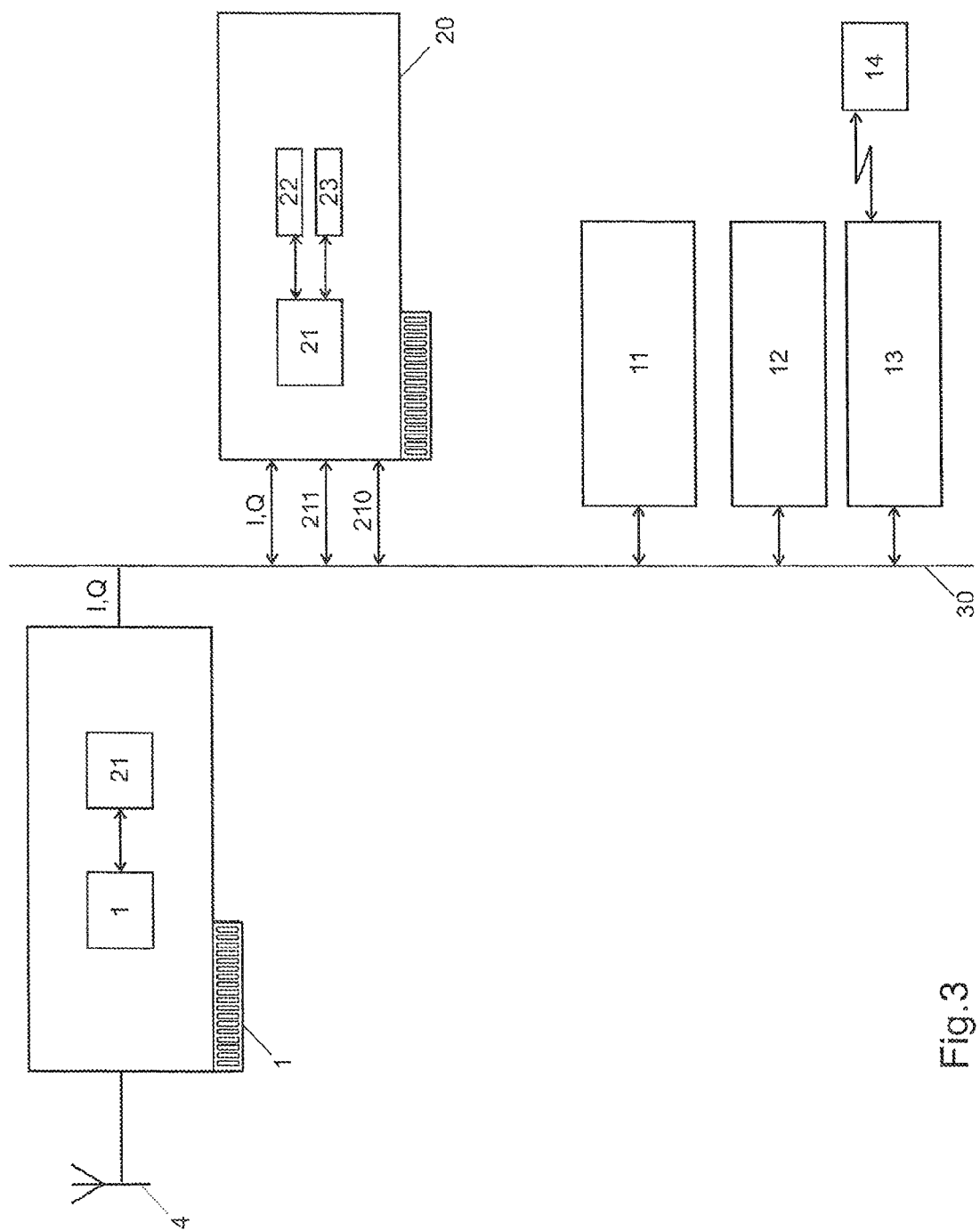
FIG. 3 is a block diagram illustrating a first embodiment of receiver according to the invention.

FIG. 3 illustrates another embodiment of the invention in which an additional baseband digital component 21 is provided, preferably on the extension card 1, for performing a part of the computing operations in the baseband and/or intermediary frequency band. The additional component 21 may be built as an independent chip or set of chips, or as a digital module on the RF chip 1. This additional component carries out a part of the operations performed by the graphic card 20 and/or by the main processor 11 in the embodiment of FIG. 2, and thus reduces the load and requirements for those components. Sharing of the computing operations between the component 21, the graphic card 20 and the main processor depends on the implementation, but in a preferred embodiment the component 21 will perform all tracking and acquisition computations, whereas repetitive tasks such as computation of FFTs is delegated to the graphic card 20. The main processor 11 is then responsible to carry out the user's front end application, including the user interface and the display of results. The baseband digital component 21 may also directly command the processor 21 of the graphic or sound card 2 and make it perform computations needed by the tracking or acquisition algorithms.

It is also possible to duplicate functions and to provide the same functionalities in the processing system of the graphic card and in the additional component 21 and/or in the general computing system 11. The choice of one or the other module to perform one operation at a specific moment depends then for example on the current load and availability of each component, on the required speed and/or on the power consumption. For example, the system may decide to compute FFT with the graphic card 20 at a particular moment, in order to put the additional component 21 or some parts of this component in stand-by mode and reduce the power consumption, and to use the additional component and/or the general purpose computer at a different moment when a fast acquisition is required.

Since during acquisition the time and frequency uncertainties are greater the computation in the frequency domain is an efficient approach to improve acquisition sensitivity and speed, however once SV's are acquired processing in the time domain can be more energy efficient, another embodiment of the system uses the graphics/sound card to accelerate acquisition and/or re-acquisition and then transfers the necessary information to a dedicated correlation engine operating in the time domain for efficient and low power tracking, thus relieving the burden on the graphics/sound card after the initial few seconds required for the acquisition.

The invention claimed is:

1. A receiver for radio positioning signals comprising digital signal processing parts for the computing of position related data based on radio signals received from a plurality of space vehicles, characterized in that said digital processing parts comprises a processor, as part of a graphic or sound card for the computing of position related data.

2. The receiver of claim 1, further comprising a high frequency part for the acquisition and processing of analog radio signals from a plurality of space vehicles, said high frequency part delivering digital intermediary signals (I, Q), or an intermediate IF data signal.

3. The receiver of claim 2, wherein said computing of position related data performed by said graphic or sound card comprises determination of relative time shifts of pseudo random noise codes comprised in the signals delivered by said high frequency part.

4. The receiver of claim 2, said digital intermediary signals delivered by the high frequency part comprising at least two orthogonal signals (I, Q).

5. The receiver of claim 2, said high frequency part being mounted on a card and comprising:
an antenna connector for connection for an antenna,
amplifiers for amplifying input signals from said antenna,
means for analog signal filtering,
a baseband converter for demodulating input signals,
analog to digital converter for converting analog demodulated signals into said digital intermediary signals.

6. The receiver claim 2, said high frequency part being connected to said graphic or sound card over a general purpose computer bus.

7. The receiver of claim 2, said high frequency part being connected to said graphic or sound card over a dedicated bus.

8. The receiver of claim 2, being made up of a personal computer, laptop or palmtop including said graphic card and a card including said high frequency part.

9. The receiver of claim 1, wherein said computing of position related data performed by said graphic or sound card comprises de-spreading of said digital intermediary signals so as to deliver a plurality of digital signals corresponding to a plurality of emitters of said radio positioning signals.

10. The receiver of claim 1, wherein said computing of position related data performed by said graphic or sound card comprises the computation of FFTs.

11. The receiver of claim 1, further comprising means for data restitution for visual and/or audio restitution of position related data based on data output by said digital signal processing parts.

12. The receiver of claim 11, said means for data restitution comprising a graphic or sound card for the visual or audio restitution of graphic or audio data,
wherein said processor used by said digital processing parts is part of said graphic or sound card.

13. The receiver of claim 11, said graphic or sound card comprising a data memory, an instruction memory and a graphic or sound processor, said instruction memory comprising first instructions for the processing of graphic or audio data for restitution by said data restitution means, and second instructions for the processing of said position related data by said graphic or sound processor.

14. The receiver of claim 11, said data restitution means comprising one or more processors for running a navigation program.

15. A method for computing position related data1 comprising:
obtaining one or more signals from at least one space vehicle,
computing position related data using digital processing parts, wherein the digital processing parts comprises a processor as part of a graphic or sound card.

16. The method of claim 15, wherein said computing comprises de-spreading of digital intermediary signals (I, Q) or IF delivered by a high frequency part.

17. The method of claim 15, wherein said computing comprises computation of Fourier transforms, for example FFTs and/or inverse FFTs.

18. The method of claim 15, wherein a decision to have said steps carried out by said graphic or sound card is automatically taken depending on power consumption criteria.

19. The method of claim 15, wherein a decision to have said steps carried out by said graphic or sound card is automatically taken depending on the current load of components of a receiver.

20. The method of claim 15, wherein a decision to have said steps carried out by said graphic or sound card is automatically taken depending on a requested acquisition speed and/or sensitivity.

21. A graphic card comprising a graphic processor and a memory with instructions for the computing of graphic functions,
characterized in that memory further comprises instructions for the computing of position related data based on radio signals received from a plurality of space vehicles.

* * * * *